Patented Mar. 6, 1934

1,949,798

UNITED STATES PATENT OFFICE 1,949,798

INSECTICIDAL COMPOSITIONS AND
METHOD OF PRODUCING SAME

Hugh Knight, Claremont, Calif., and Lloyd C.
Swallen and William J. Bannister, Terre Haute,
Ind., assignors to Emulsoids, Inc., New York,
N. Y., a corporation of Delaware No Drawing. Application March 11, 1932,
Serial No. 598,300

5 Claims. (Cl. 167—43)

The present invention relates to insecticidal compositions and to materials suitable for use therein.

Many types of compositions have previously been suggested for use in destroying insects, parasites, etc. Much difficulty has been experienced with these compositions for the reason that many of them are ineffective as insecticides and still others which do have good insecticidal properties, seriously damage the trees or other vegetation to which the compositions are applied. For reasons which will appear later the compositions herein disclosed and claimed have a number of advantages over previous insecticides and more nearly approach the ideal composition than any previously known.

Unless insoluble in water or not readily absorbed by plant tissues, most chemical products used to combat plant parasites have an injurious action on the plants if they are not applied in carefully controlled concentrations. It is, therefore, necessary in the case of many chemical agents to use rather dilute solutions or low concentrations of the particular agent in order to destroy the parasite and still not harm the plant. For example, a spray containing a petroleum oil at a concentration of 2% may successfully kill all insects infesting the plant without appreciably injuring the plant, whereas, if the concentration is increased to 8% or 10%, serious injury to the plant often follows.

If the chemical products used are in the liquid form it is important that they be of such a character, or such concentration, or so used that they will not appreciably harm the plant when absorbed into the plant tissue. At the same time it is necessary that the insecticidal agent be employed in a concentration sufficient to kill the insect. In order to insure a satisfactory control of the insect pests, it is also necessary that the plant be thoroughly covered with the insecticidal agent because of the minute size of some of these insects, and since certain of them and their larvae are covered with a coat of wax or with hair and down which render contact between the insects and the insecticidal agent difficult.

Due to the effective insecticidal properties of petroleum and petroleum distillates numerous efforts have been made to use these materials in insecticidal compositions or directly as such. However, these materials are very toxic to vegetation and hence it is difficult to obtain a satisfactory degree of coverage which will not at the same time seriously damage the tree or shrub to which the insecticidal composition has been applied. Attempts have been made to overcome the latter difficulty by applying the petroleum in the form of an emulsion with water. Application of the petroleum in this form has, in general, given much more satisfactory results due to the fact that a sufficiently thick and uniform film of the oil could be applied to the vegetation to insure the destruction of substantially all of the insects and at the same time not so thick as to cause serious damage to the vegetation. The types of such compositions which have previously been available, however, have possessed certain properties making them generally unsatisfactory for several reasons.

The emulsifying agents previously used in spray oil emulsions are of a number of different types. Those that are oil-miscible, and thus permit of the production of the emulsion in the field, are generally in themselves quite harmful to green vegetation and hence suitable for use only in dormant or winter sprays. For the preparation of emulsions of highly refined oils to be used on green vegetation, the casein-albumen type of emulsifying agent which is not oil soluble has probably been most generally employed. These highly refined oils are generally emulsified by means of special machinery and shipped to the user in the form of a "paste" containing usually only 80 to 87% of insecticide oil, and 20 to 13% of inert material, water and emulsifying agent. These paste emulsions have a number of serious disadvantages. In the first place, when stored for long periods or under extremes of heat and cold, they will "break down" into layers of free oil and water and must then be returned to the factory for reprocessing. The necessity of paying freight charges on the inert material, water and emulsifying agent in these emulsions also adds to the cost of the actual insecticide. Furthermore, these paste emulsions must be dipped from the container and because of their consistency are difficult and messy to handle.

It has now been discovered that by using as the emulsifying agent materials such as polyhydric alcohols partially esterified with certain acids, an insecticidal oil emulsion may be obtained which does not possess the disadvantages enumerated above. Emulsifying agents of this type are in general either completely or substantially miscible with the oils to be emulsified and hence can be mixed in the required amounts with oil and the oil then emulsified with water in the usual spraying equipment immediately prior to the application to the trees or plants. Another important advantage in the use of emulsifying agents of this type is the fact that in the concentration required to produce a desirable type of emulsion they cause relatively little, if any damage to green vegetation and hence may be used with summer as well as winter type spray oils. Still another advantage in their use in the fact that they produce in general what may be termed quick-breaking emulsions. Emulsions of the latter type which revert into a water and an oil layer relatively soon after their application appear usually to give somewhat better kills than is the case under similar conditions with a more stable type of emulsion.

Emulsifying agents of the type of polyhydric alcohols partially esterified with acids cover a fairly wide range of compounds and naturally differ somewhat in both chemical composition and physical properties. Compounds of the type contemplated are derivatives of polyhydric alcohols such as glycerol, ethylene glycol, butylene glycol, erythritol, arabitol, mannitol, etc. By referring to the compounds used as "partially esterified polyhydric alcohols" it is meant that at least one of the hydroxyl groups of the alcohol has not been esterified by an acid. The partial esterification of the alcohols may be accomplished by means of either a saturated or unsaturated fatty acid, and while one of the lower acids of the series may be employed, as for example acetic, propionic or butyric acids, it is preferred to make use of an acid of the "higher fatty acid" series, or in other words, one having in the neighborhood of ten or more carbon atoms in each molecule. Among such are stearic, palmitic, oleic and linoleic acids. Suitable higher hydroxy fatty acids are: ricinoleic, dihydroxy stearic, hydroxy sebacic, etc. acids. In addition to the latter type of compound, derivatives thereof, namely acylated hydroxy acids, such as acetyl ricinoleic acid, butyryl hydroxy sebacic acid, etc., may also be used. If the particular alcohol used has more than two hydroxyl groups it is of course possible to have mixed esters of the type contemplated, that is, a different acid radicle may be reacted with each of the hydroxyl groups removed from the alcohol.

Esters of the type hereinabove referred to may be obtained in a number of ways. For example, a polyhydric alcohol may be esterified with an acid so as to insert acid radicles at the point of one or more, but not all, of the hydroxyl groups of the alcohol. A second suitable method consists of partially hydrolyzing a completely esterified compound of the required type, as for example, a glyceride. The following specific example will serve to illustrate still another suitable procedure for these compounds.

*Example I*

Glycerylmonochlorhydrin was first prepared by treating glycerol with hydrochloric acid gas, according to the procedure outlined in Organic Syntheses (J. B. Conant) vol. II, page 29. Oleic acid was next dissolved in somewhat more than its weight of a solvent (dibutyl ether) and then neutralized with a concentrated solution of sodium methoxide in methanol. To the neutralized fatty acid there was next added somewhat less than the theoretical amount of glyceryl monochlorhydrin. After vigorous shaking, the flask containing the mixture was gradually heated to a temperature of 140–150° C. at which point it was held for a period of 4 to 5 hours. At the end of the reaction the dibutyl ether was removed as a constant boiling mixture with water and the excess sodium soap converted to the corresponding barium soap by the addition of a solution of barium chloride. The glyceryl mono-oleate was then separated from the insoluble barium soap by extraction with acetone.

The relative efficacy of a number of glycerides as emulsifying agents is shown in Table I below. Varying amounts of the emulsifying agent were shaken for exactly one minute in a test tube with 10 parts of spray oil plus emulsifying agent, and 40 parts of distilled water. Observations were then made as to the time for one-fourth to one-half of the oil to separate out in a clear layer.

Certain of the emulsifying agents herein referred to are substantially oil-soluble whereas others are relatively insoluble. In order to employ the latter satisfactorily it is generally advisable or necessary to use also a "bonding agent" so as to obtain a sufficiently intimate association of the various materials to give a good emulsion. As a bonding agent in the present instance one may use a substance which is substantially soluble in the oil to be emulsified and in which the emulsifying agent to be used is substantially soluble. And while not essential, it is preferred to use a material having properties such that not more than a few per cent (based on the total volume of oil) will be required. In general, the triglycerides of fatty acids are suitable bonding agents. Materials of entirely different chemical character, e. g., n-butyl ricinoleate, are also suitable.

*Table I*

| Emulsifier | Conc. in oil | | Time of settling | | Remarks |
| --- | --- | --- | --- | --- | --- |
| | Emulsifier | Bonding agent—butyl ricinoleate | 1/4 | 1/2 | |
| Glyceryl mono-oleate | 2.0% | | 5 days | 6 days | Not broken after 10 days. |
| | 0.5 | | 4 days | 5 days | |
| | 0.25 | | 3½ days | 4 days | |
| | 0.16⅔ | | 150 min | 250 min | |
| | 0.10 | | | | |
| Glyceryl di-oleate | 2.0 | | 80 hrs | 84 hrs | All emulsions broke in spots, giving cream globules floating in clear oil. |
| | 0.5 | | 24 hrs | | |
| | 0.25 | | 4½ hrs | 5 hrs | |
| | 0.16⅔ | | 45 min | 60 min | |
| Glyceryl mono-ricinoleate | 0.5 | 1.5% | 4 hrs | 30.4 hrs | |
| | 0.25 | 1.75 | 3½ hrs | 8 hrs | |
| | 0.16⅔ | 1.83½ | 1⅔ hrs | 4 hrs | |
| Glyceryl di-ricinoleate | 0.5 | 1.5 | 1⅔ hrs | 30 hrs | This and each of the following emulsifying agents relatively insoluble in oil, thus necessitating use of binding agent. Without bonding agent, 2 percent concentration of these emulsifying agents gave emulsions which separated into clear oil and clear water in one to two hours. |
| | 0.25 | 1.75 | 70 min | 2⅔ hrs | |
| | 0.16⅔ | 1.83½ | 50 min | 3 hrs | |
| Glyceryl monoacetyl ricinoleate | 0.5 | 1.5 | 3 hrs | 24 hrs | |
| | 0.25 | 1.75 | 75 min | 2 hrs | |
| | 0.15⅔ | 1.83½ | 45 min | 2 hrs | |
| Glyceryl di-acetyl ricinoleate | 0.5 | 1.5 | 2⅔ hrs | 8 hrs | |
| | 0.25 | 1.75 | 40 min | 75 min | |
| | 0.16⅔ | 1.83½ | 12 min | 35 min | |

From the above table it will be seen that the mono-substituted esters in general produce more lasting types of emulsions than is the case with the di-substituted esters. The same general rule appears to hold true with the partially substituted esters of other polyhydric alcohols.

In the preparation of insecticidal compositions with the herein-above disclosed materials at least two broad types of oils may be employed, depending upon whether the insecticide is to be used during the period of the year when the trees or shrubbery have growing buds and leaves or during the period when they are in a dormant stage or contain no growing buds and leaves.

For summer use or when growing buds and leaves are on the trees it is necessary to employ a more highly refined type of oil than for winter use. Oils suitable for summer use are generally designated as "phytonomic" oils and are as a rule obtained by treating with fuming sulfuric acid a lubricating stock of suitable viscosity. By this, or other suitable treatment, the unsaturated hydrocarbons and other materials said to be particularly harmful to plant tissue are largely removed. Spray oils of this type having viscosities ranging from about 50 to 300 seconds Saybolt at 100° F. are commonly known in the trade as "white oils", "refined white oils", etc.

Spray oil for application during the winter months or when the trees are in a dormant state may be prepared from much less pure grades of oils. Oils suitable for use in dormant type sprays range in viscosity from 70 to 300 seconds Saybolt at 100° F. and from 85 to 100% in unsulphonated residue. Many grades of such oils suitable for use in dormant oil sprays are on the market and, in general, are satisfactory for use in the compositions herein disclosed and claimed.

In certain cases it has been found that the oil alone does not give a sufficiently high degree of toxicity to insect pests and that consequently the incorporation of active insect poisons in the composition is desirable. Many types of toxic materials are suitable for this purpose. While not absolutely essential, it is of course desirable to use a poison which is soluble in or miscible with the oil. Examples of insect poisons suitable for incorporating in oil emulsions are as follows: strychnine, nicotine, nitrobenzene, benzaldehyde, fatty acids derived from vegetable and animal oils, esters of the fatty acids derived from animal or vegetable fats and oils, such as butyl ricinoleate, amyl oleate, propyl linoleate, the butyl esters of whale oil fatty acids, etc.

The following specific examples will serve to illustrate preferred types of the compositions herein disclosed and claimed. It is distinctly understood, however, that the present invention is not limited to the specific combinations and proportions of constituents set forth in these examples, since, as has previously been set forth, the various constituents of the series herein disclosed vary somewhat in their properties.

Example II

| | Per cent |
|---|---|
| Glyceryl mono-oleate | 0.10– 2.0 |
| Spray oil | 99.90–98.0 |

Glyceryl mono-oleate and spray oil are completely miscible and form very stable mixtures which can be emulsified as desired by agitating with the desired quantities of water. In general, 99–97% by volume of water to 1–3% by volume of spray oil-glyceryl mono-oleate gives a very satisfactory insecticide.

Example III

| | Per cent |
|---|---|
| Glyceryl di-oleate | 0.20– 2.0 |
| Nitrobenzene | 2.50– 5.0 |
| Spray oil | 97.30–93.0 |

Example IV

| | Per cent |
|---|---|
| Glycol mono-oleate | 0.20– 2.0 |
| Butyl esters of whale oil fatty acids | 5.00–10.0 |
| Spray oil | 94.80–88.0 |

The nitrobenzene and butyl esters of whale oil fatty acids of Examples III and IV serve as insect poisons where a higher degree of toxicity is required in the emulsions made from these compositions.

Example V

| | Per cent |
|---|---|
| Glyceryl mono-acetyl ricinoleate | 0.20– 2.0 |
| Butyl ricinoleate | 1.00–10.0 |
| Spray oil | 98.80–88 |

The butyl ricinoleate in this case serves a double function, namely, as a bonding agent and as an insect poison. As previously indicated some of the emulsifying agents herein disclosed are relatively insoluble in spray oil and hence in order to get a desirable type of emulsion it is necessary to incorporate the emulsifying agent in a material which is completely miscible with the spray oil.

Example VI

| | Per cent |
|---|---|
| Glyceryl mono-ricinoleate | 0.20– 2.0 |
| Triolein | 1.00–10.0 |
| Spray oil | 98.80–88 |

The triolein here serves as a bonding agent between the oil and emulsifying agent.

Emulsions prepared with water and compositions such as those disclosed above are particularly effective against red spiders, plant lice, the red scale of citrus fruits, and other pests which infest fruit trees. When thoroughly agitated with water and sprayed onto the trees until the foliage of the latter is dripping wet, effective destruction of the insects has consistently resulted without any injurious effect on the trees.

What is claimed is:

1. As an insecticide composition, an insecticidal mineral oil in combination with a polyhydroxy alcohol partially esterified with a high molecular weight fatty acid, the amount of the ester being upwards of 0.1% but less than 2.0% based on the mineral oil.

2. The composition of claim 1 wherein the fatty acid is oleic acid.

3. The composition of claim 1 wherein the fatty acid is stearic acid.

4. As an insecticide composition, a refined mineral oil containing an amount less than 2% and more than one-tenth of a percent by weight of glyceryl oleate which contains at least one free hydroxy group.

5. As an insecticide for sensitive plant foliage, a refined white mineral oil in combination with less than 2% but more than one-tenth of a percent of a polyhydroxy alcohol partially esterified with a high molecular weight fatty acid.

HUGH KNIGHT.
LLOYD C. SWALLEN.
WILLIAM J. BANNISTER.